(12) United States Patent
Schroeder et al.

(10) Patent No.: US 9,243,697 B2
(45) Date of Patent: Jan. 26, 2016

(54) NUT WITH FLEXIBLE FINGERS AND RADIAL COMPRESSION MEMBERS

(71) Applicants: Robert Schroeder, Machesney Park, IL (US); Jonathan R. Schroeder, Machesney Park, IL (US)

(72) Inventors: Robert Schroeder, Machesney Park, IL (US); Jonathan R. Schroeder, Machesney Park, IL (US)

(73) Assignee: Pacific Bearing Company, Rockford, IL (US)

(*) Notice: Subject to any disclaimer, the term of this patent is extended or adjusted under 35 U.S.C. 154(b) by 348 days.

(21) Appl. No.: 13/720,540

(22) Filed: Dec. 19, 2012

(65) Prior Publication Data
US 2013/0160585 A1 Jun. 27, 2013

Related U.S. Application Data (60) Provisional application No. 61/579,699, filed on Dec. 23, 2011.

(51) Int. Cl.
*F16H 25/08* (2006.01)
*F16H 25/20* (2006.01)
*B23P 11/02* (2006.01)

(52) U.S. Cl.
CPC ............ *F16H 25/2009* (2013.01); *B23P 11/02* (2013.01); *F16H 25/08* (2013.01); *Y10T 29/49863* (2015.01); *Y10T 29/49876* (2015.01); *Y10T 74/18728* (2015.01)

(58) Field of Classification Search
CPC .......................... F16H 25/2003; F16H 25/2009
USPC ................... 74/89.23, 89.42, 424.78, 424.79; 267/161
See application file for complete search history.

(56) References Cited

U.S. PATENT DOCUMENTS

| 2,228,244 | A |   | 1/1941  | Baker           |        |
|-----------|---|---|---------|-----------------|--------|
| 2,348,611 | A |   | 5/1944  | Davidson        |        |
| 3,359,792 | A |   | 12/1967 | Lukens          |        |
| 3,656,358 | A |   | 4/1972  | Kopp            |        |
| 3,713,932 | A |   | 1/1973  | Butzow et al.   |        |
| 3,977,269 | A | * | 8/1976  | Linley, Jr.     | 74/441 |
| 4,131,031 | A |   | 12/1978 | Erikson et al.  |        |
| 4,210,033 | A |   | 7/1980  | Erikson et al.  |        |
| 4,249,426 | A |   | 2/1981  | Erikson et al.  |        |
| 4,274,294 | A |   | 6/1981  | Siryj et al.    |        |

(Continued)

FOREIGN PATENT DOCUMENTS

GB  2 408 301 A  5/2005
JP  61-228157 A  10/1986

(Continued)

OTHER PUBLICATIONS

Haydon Kerk NEWS; date last visited Jan. 13, 2012; 1 page printed from Internet; http://www.haydonkerk.com/News/tabid/231/novusact/viewarticle/Default.aspx?articleid=RGMUPZ00Xgo.

(Continued)

*Primary Examiner* — David M Fenstermacher
(74) *Attorney, Agent, or Firm* — Reinhart Boerner Van Deuren P.C.

(57) ABSTRACT

A nut and lead screw assembly is disclosed. The nut includes a plurality of flexible fingers for adjusting the engagement of a threaded or unthreaded portion of the nut with corresponding threads of a lead screw. The engagement between the nut and the lead screw is adjusted by installing at least one radial compression member into a circumferential groove formed in the outer surface of the flexible fingers.

27 Claims, 11 Drawing Sheets

(56) References Cited

U.S. PATENT DOCUMENTS

| | | |
|---|---|---|
| 4,282,764 A | 8/1981 | Harris |
| 4,434,677 A * | 3/1984 | Linley, Jr. ................ 74/409 |
| RE32,433 E | 6/1987 | Erikson et al. |
| 4,954,032 A | 9/1990 | Morales |
| 5,027,671 A | 7/1991 | Erikson et al. |
| 5,303,606 A | 4/1994 | Kokinda |
| 5,601,372 A | 2/1997 | Erikson et al. |
| 5,732,596 A | 3/1998 | Erikson et al. |
| 5,913,940 A | 6/1999 | Erikson et al. |
| 5,913,941 A | 6/1999 | Erikson et al. |
| 5,937,702 A | 8/1999 | Erikson et al. |
| 6,041,671 A | 3/2000 | Erikson et al. |
| 6,099,166 A | 8/2000 | Erikson et al. |
| 6,117,249 A | 9/2000 | Erikson et al. |
| 6,131,478 A | 10/2000 | Erikson et al. |
| 6,202,500 B1 | 3/2001 | Erikson et al. |
| 6,240,798 B1 | 6/2001 | Erikson et al. |
| 6,267,021 B1 * | 7/2001 | Mauro .................. 74/89.42 |
| 6,415,673 B1 | 7/2002 | Erikson et al. |
| 6,422,101 B2 | 7/2002 | Erikson et al. |
| 6,467,362 B2 | 10/2002 | Erikson et al. |
| 6,880,417 B2 | 4/2005 | Nagai et al. |
| 7,219,570 B2 | 5/2007 | Erikson et al. |
| 7,506,557 B2 | 3/2009 | Hosokai et al. |
| 7,552,657 B2 | 6/2009 | Erikson et al. |
| 7,891,265 B2 | 2/2011 | Erikson et al. |
| 7,992,456 B2 | 8/2011 | Schroeder et al. |
| 8,028,594 B2 | 10/2011 | Schroeder |
| 2004/0093971 A1 | 5/2004 | Fujibayashi |
| 2007/0295128 A1 | 12/2007 | Erikson et al. |
| 2008/0119294 A1 | 5/2008 | Erikson et al. |
| 2009/0249910 A1 | 10/2009 | Erikson et al. |
| 2011/0247904 A1 * | 10/2011 | Yamasaki ................ 188/72.1 |
| 2013/0133448 A1 * | 5/2013 | Schroeder et al. .......... 74/89.32 |

FOREIGN PATENT DOCUMENTS

| | | |
|---|---|---|
| JP | 2001-221313 A | 8/2001 |
| JP | 2001-280440 A | 10/2001 |
| JP | 2003-240098 A | 8/2003 |
| WO | WO 2006/106817 A1 | 10/2006 |

OTHER PUBLICATIONS

U.S. Appl. No. 61/579,699, filed Dec. 23, 2011, Schroeder et al.

* cited by examiner

NUT WITH FLEXIBLE FINGERS AND RADIAL COMPRESSION MEMBERS

CROSS-REFERENCE TO RELATED PATENT APPLICATIONS

This patent application claims the benefit of U.S. Provisional Patent Application No. 61/579,699, filed Dec. 23, 2011, the entire teachings and disclosure of which are incorporated herein by reference thereto.

FIELD OF THE INVENTION

This invention generally relates to lead screw assemblies and more particularly to nuts for lead screw assemblies and even more particularly to nuts for lead screw assemblies that include flexible fingers as well as lead screw assemblies that include nuts with flexible fingers.

BACKGROUND OF THE INVENTION

Lead screw assemblies are well known devices for linearly actuating devices. A lead screw assembly uses rotational motion of a lead screw to linearly actuate a nut having internal threads that engage the external threads of the lead screw. Rotation of the screw in a first rotational direction actuates the nut in a first linear direction along the axis of the screw and reversing rotation of the screw to a second rotational direction actuates the nut in a second linear direction, opposite the first linear direction, along the axis of the screw. As such, the nut is mounted for rectilinear motion along the lead screw.

Prior lead screw assemblies are known, for example, U.S. Pat. No. 5,913,940 to Erikson et al., RE 32,433 to Erikson et al., and U.S. Pat. No. 8,028,594 to Schroeder and assigned to the assignee of the instant application illustrate lead screw assemblies that include nuts that have flexible fingers to permit adjustment or predetermined biasing of the threads of the nut towards and against the threads of the lead screw.

One problem with prior art nuts with flexible fingers is that they use an axial force to bias an inclined ramp against a rib or projection on the outer surface of the flexible fingers. The interaction of the ramp and rib/projection transform the axial force into a radially directed force. Unfortunately, to create sufficient radial force, the ramp angle must be relatively large. This creates an interface between the inclined ramp and the projection that experiences significant stick slip. The stick slip reduces the functionality of the device limiting the ability for infinite compensation.

The present invention is directed toward improvements in relation to the lead screw and nut interaction of lead screw assemblies.

BRIEF SUMMARY OF THE INVENTION

The present invention has several aspects that may be claimed and stand as patentable individually or in combination including but not limited to the following.

In one aspect, the invention provides a nut for linear movement along a lead screw. The nut includes a base, a plurality of flexible fingers joined to the base and extending axially from the base between a fixed end joined to the base and a free end, at least one radial compression member, and at least one axial locator structure formed in an outer surface of the flexible fingers. The at least one radial compression member being installed proximate the at least one axial locator structure to apply a compressive force to the plurality of flexible fingers.

According to a preferred arrangement of embodiments of this first aspect, the axial locator structure is a circumferential groove.

In another aspect, an embodiment provides an axially extending gap angularly separates adjacent flexible fingers.

In another embodiment, the nut may include the base and the plurality of flexible fingers are composed of a plastic material.

In yet another aspect, an embodiment provides an apparatus where a first diameter of an outer surface of the circumferential groove is larger than a second diameter of an inner surface of the continuous rigid ring when the continuous rigid ring is in an unmounted state.

In yet another aspect, an embodiment provides an apparatus where a first diameter of an outer surface of the circumferential groove is the same size as a second diameter of an inner surface of the continuous rigid ring when the continuous rigid ring is in a mounted state.

In yet another embodiment, the at least one radial compression member is in the form of a continuous rigid ring.

In yet another embodiment, the radial compression member is in the form of a circular elastic band.

In yet another embodiment, the radial compression member is in the form of a snap ring having a mouth therein.

In another aspect, the base and the plurality of flexible fingers define a screw receiving passage, at least a portion of the screw receiving passage being internally threaded for engagement with the lead screw.

In another embodiment, the base is internally threaded and configured to engage an external thread of the lead screw and at least a portion of an interior surface of the plurality of flexible fingers is smooth.

In yet another aspect, the smooth surface on the interior of the plurality of flexible fingers engages the external threads of the lead screw.

In another aspect, at least 50% of the interior surface of the plurality of the flexible fingers is smooth.

In yet another embodiment, the interior surface of the plurality of the flexible fingers is smooth from the axial locator structure to a distal end of the plurality of flexible fingers.

In another embodiment, the base is internally threaded and configured to engage an external thread of the lead screw and at an entire surface area of an interior surface of the plurality of flexible fingers is smooth.

In another aspect, the invention provides a method of installing a nut onto a lead screw. The method calls for compressing a plurality of flexible fingers radially inward. The method also calls for mounting at least one radial compression member into a groove formed in an exterior surface of the plurality of flexible fingers. Further, the method calls for inserting the lead screw into a channel formed by the base portion and the plurality of flexible fingers and engaging threads provided at least by the base with the lead screw.

In another aspect of the method, the at least one radial compression member is in the form of a rigid ring.

In yet another embodiment, the step of mounting further comprises sliding the rigid ring over the plurality of flexible fingers toward a base portion of the nut prior to the step of inserting the lead screw.

In another embodiment, the radial compression member is in the form of a circular elastic band.

In another aspect, the step of mounting further includes expanding a circumference of the circular elastic band such that the circumference of the circular elastic band is larger than a circumference of the plurality of flexible fingers prior to the step of inserting the lead screw. And the method includes an additional step for sliding the elastic band over the plurality of flexible fingers toward a base portion of the nut prior to the step of inserting the lead screw.

In another embodiment, the radial compression member is in the form of a snap ring comprising a mouth.

In another aspect, the step of mounting further includes aligning the mouth of the snap ring with the groove and pressing the snap ring against the groove until the snap ring slides into position around the groove.

In yet another aspect, the step of mounting further includes expanding a circumference of the snap ring such that the circumference of the snap ring is larger than a circumference of the plurality of flexible fingers subsequent to the step of inserting the lead screw and sliding the snap ring over the plurality of flexible fingers toward a base portion of the nut.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
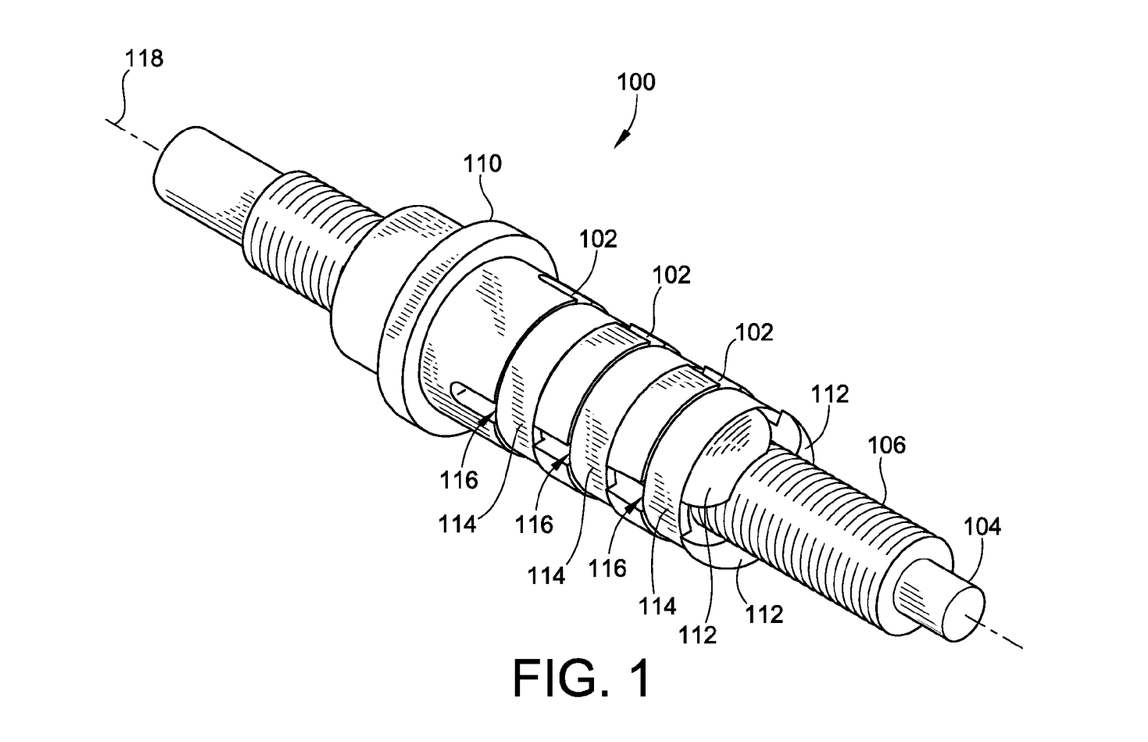
FIG. 1 is a perspective view of a first embodiment of a lead screw and nut assembly according to the teachings of the present invention.

FIG. 1 illustrates a nut assembly 100 (also "nut 100") installed on an externally threaded lead screw 104 such that rotational motion of the lead screw 104 translates to linear motion of the nut 100. This linear motion can then be used to drive an external device such as a carriage or other mechanism attached to the nut 100.

The nut 100 includes a plurality of flexible fingers 112 that axially extend from an annular base 110 generally parallel to the rotational axis 118 of lead screw 104. In this embodiment and with reference to FIG. 2, the base 110 and the flexible fingers 112 generally define a central channel that receives lead screw 104 and which is internally threaded. In this embodiment, both the inner surfaces of the flexible fingers 112 and the inner surface of the base 110 are threaded internally in the form of internal threads 120 such that the nut 100 engages external threads 106 of the lead screw 104.

Further, the plurality of flexible fingers 112 are separated by axially extending gaps 102, which extend from the base 110 the entire length of the flexible fingers 112. The flexible fingers 112 terminate in a free distal end opposite the base end. The nut 100 illustrated in FIG. 1 includes exactly three flexible fingers 112 and three axially extending gaps 102. However, more or less flexible fingers 112 and gaps 102 could be incorporated in other embodiments. It is a feature that the nut is configured such that the flexible fingers 112 engage the lead screw 104 with a constant force even as it wears, such that the load required to rotate the lead screw 104 stays constant. This can be evidenced by a constant (non-varying) drive current which is indicative of the electric power used to drive the electric motor rotating the lead screw 104.

The nut 100 is generally formed from a plastic material. However, in other embodiments of the invention the material contemplated is metal. Further, the plastic material used to form the base 110 and the flexible fingers 112 may be of a different type such that one is more rigid than the other. Additionally, the internal threads 120 may be composed of a different plastic material than the base 110 or flexible fingers 112. Specifically, the internal threads 120 are contemplated to be formed from a lubricous plastic material to reduce friction between the lead screw 104 and the nut 100.

The fingers 112 may have stiffening structures embedded therein to oppose lateral or angular flexure of the flexible fingers 112 generally about rotational axis 118. These stiffening structures could be radially thin pieces of metal transitioning across the interface between the base and the flexible fingers and preferably extending a substantial length along the fingers. Preferably, the stiffening members extend at least 50% of the length of the flexible fingers 112 and even more preferably at least 75%. The fingers will typically be larger in an angular direction (i.e. in a width direction) to provide good resistance to angular twisting/bending due to the torque load on the flexible fingers 112 in operation.

In the present embodiment, nut 100 includes at least one radial compression member illustrated in the form of a continuous ring or by another name a compression ring 114.

However, various other types of compression rings 114 are contemplated. For instance, in one embodiment, the compression ring 114 may be tailored to the flexible fingers 112 such that a constant radially directed force is applied to the lead screw 104 from the flexible fingers 112.

FIG. 1 includes three compression rings 114. Each compression ring 114 fits into a corresponding axial locator structure in the form of circumferential groove 116 formed in the flexible fingers 112. Specifically, FIG. 1 includes three circumferential grooves 116, one for each compression ring 114. Further, because the grooves 116 are formed in the flexible fingers 112, the grooves 116 are not continuous structures and are separated/segmented by the axially extending gaps 102. When the compression rings 114 are installed in the grooves 116, the flexible fingers 112 have a direct radial compression force applied toward the lead screw 104 by the compression ring 114. This force creates a compression in a radial direction between the flexible fingers 112 and the lead screw 104 maintaining the nut 100 in a precise location along the lead screw 104. Further, this force is not converted from an axial directed force like prior designs. This configuration reduces the stick slip friction problem where the inclined ramp arrangements are used like in the prior art.

In one embodiment of the present invention, the compression rings 114 are formed from a rigid plastic material. However, other materials such as metal and elastic materials are contemplated as well. Depending on what material is used or design of the thereof, the compression rings 114 may either be constant force or variable force compression rings 114. A constant force compression ring 114 applies the same force whether or not the internal diameter of the compression ring 114 changes. Thus, the compression ring 114 will experience constant force over the lifetime of the use of the compression ring 114 even when the inner diameter changes due to wear of the nut 100. A variable force compression ring 114 applies a variable force when the inner diameter of the ring 114 changes. Thus, the compression ring 114 of this type will experience varying force over the lifetime of the use of the compression ring 114.

Figure 2:
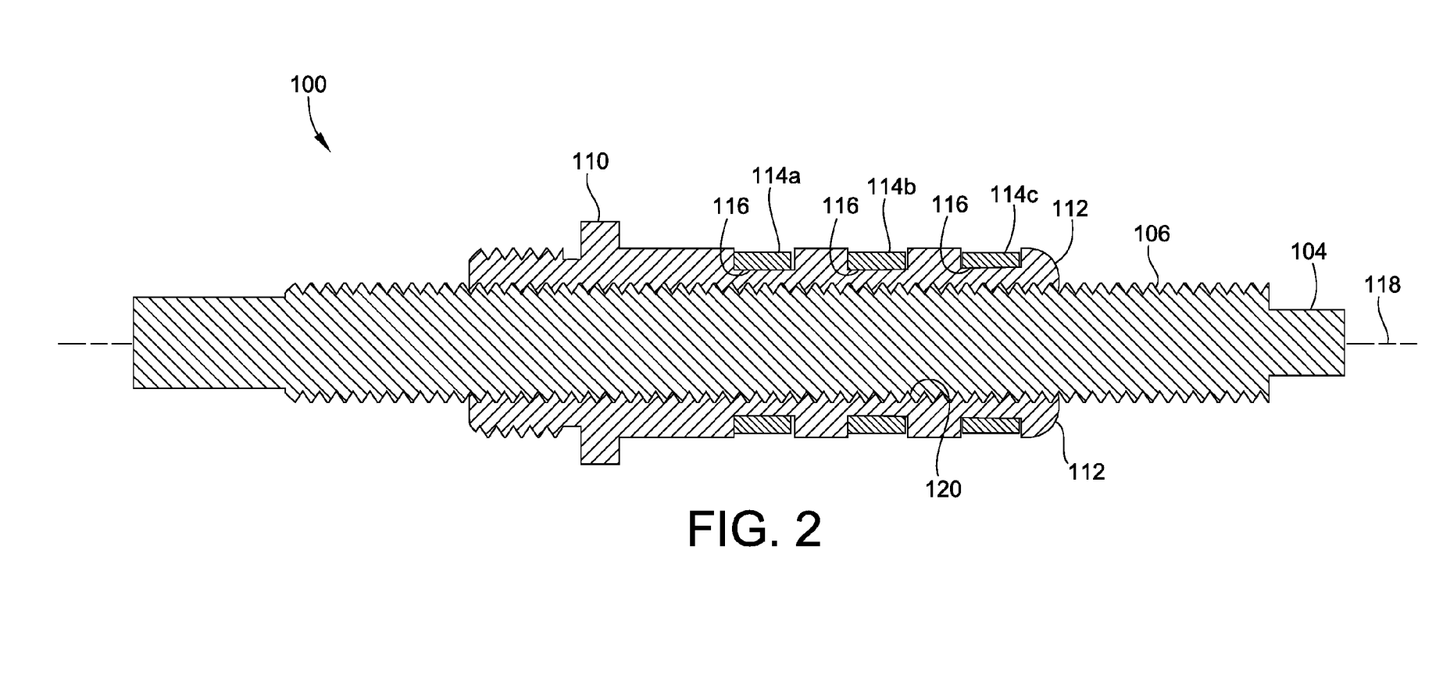
FIG. 2 is a cross section view of the nut and lead screw assembly in accordance with a particular embodiment of the present invention.

FIG. 2 illustrates a cross-section view of the nut 100 installed on a lead screw 104. Additionally, compression rings 114 are installed in grooves 116, which apply the radial force on the flexible fingers 112 toward the lead screw 104. This causes the internal threads 120 of the flexible fingers 112 to engage the external threads 106 of the lead screw 104. The internal threads 120 engaging the external threads 106 provide a maximum contact area between the flexible fingers 112 and the lead screw 104.

Further, the compression of the flexible fingers 112 caused by the compression rings 114 forces the internal threads 120 to engage the external threads 106 with a greater force than would normally be applied without the compression rings 114. This assists in preventing unwanted axial slop or motion along an axis 118 between the nut 100 and lead screw 104. By reducing slop, backlash is also reduced and/or eliminated when the lead screw 104 changes rotational direction.

Additionally, in a further embodiment of the present invention, compression rings 114 come in various sizes. By changing the size of the compression ring 114, various compression forces can be achieved. Changing compression is desirable when the nut 100 is used in different applications that may require greater or lesser accuracy in the linear position of the nut 100 along the lead screw 104. This will also allow the user to adjust the nut 100 due to wear.

Additionally, the compression applied by the plurality of the compression rings 114 can be different for each ring 114. For instance, FIG. 2 illustrates compression rings 114a, 114b, and 114c. Each of compression ring 114a, 114b, or 114c may apply a different compression force on the flexible fingers 112. This may be accomplished by changing the dimensions (i.e. diameter/thickness) or material of the compression rings 114a, 114b, and 114c.

Figure 3:
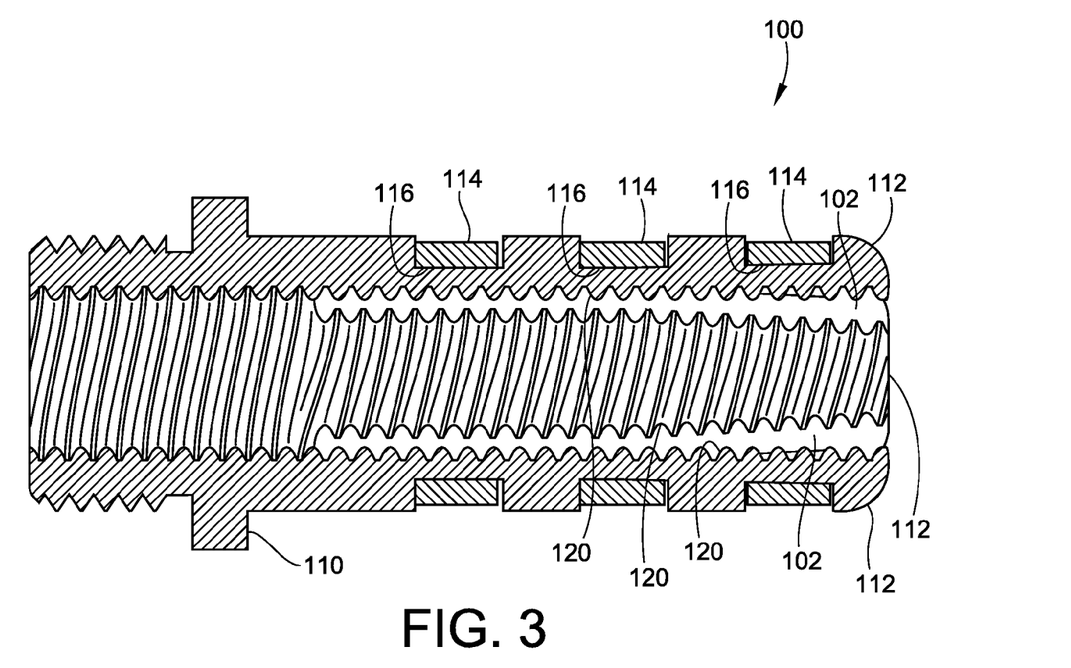
FIG. 3 is a close up view of a cross section of the nut in accordance with a particular embodiment of the present invention.

FIG. 3 illustrates a cross-section view of the nut 100 without the lead screw 104 (see FIG. 1). The internal threads 120 of the flexible fingers 112 are illustrated without the lead screw 104. The internal threads 120 extend the entire length of the nut 100 in this embodiment such that the base 110 and flexible fingers 112 are both internally threaded. The internal threads 120 will engage the external threads 106 (see FIG. 1) of the lead screw 104 during typical operation of the nut 100. Over time the internal threads 120 may experience wear from use. To eliminate slop between the nut 100 and lead screw, a new set of compression rings 114 may be installed such that an increased radial force is applied to the flexible fingers 112.

Figures 4, 4A:
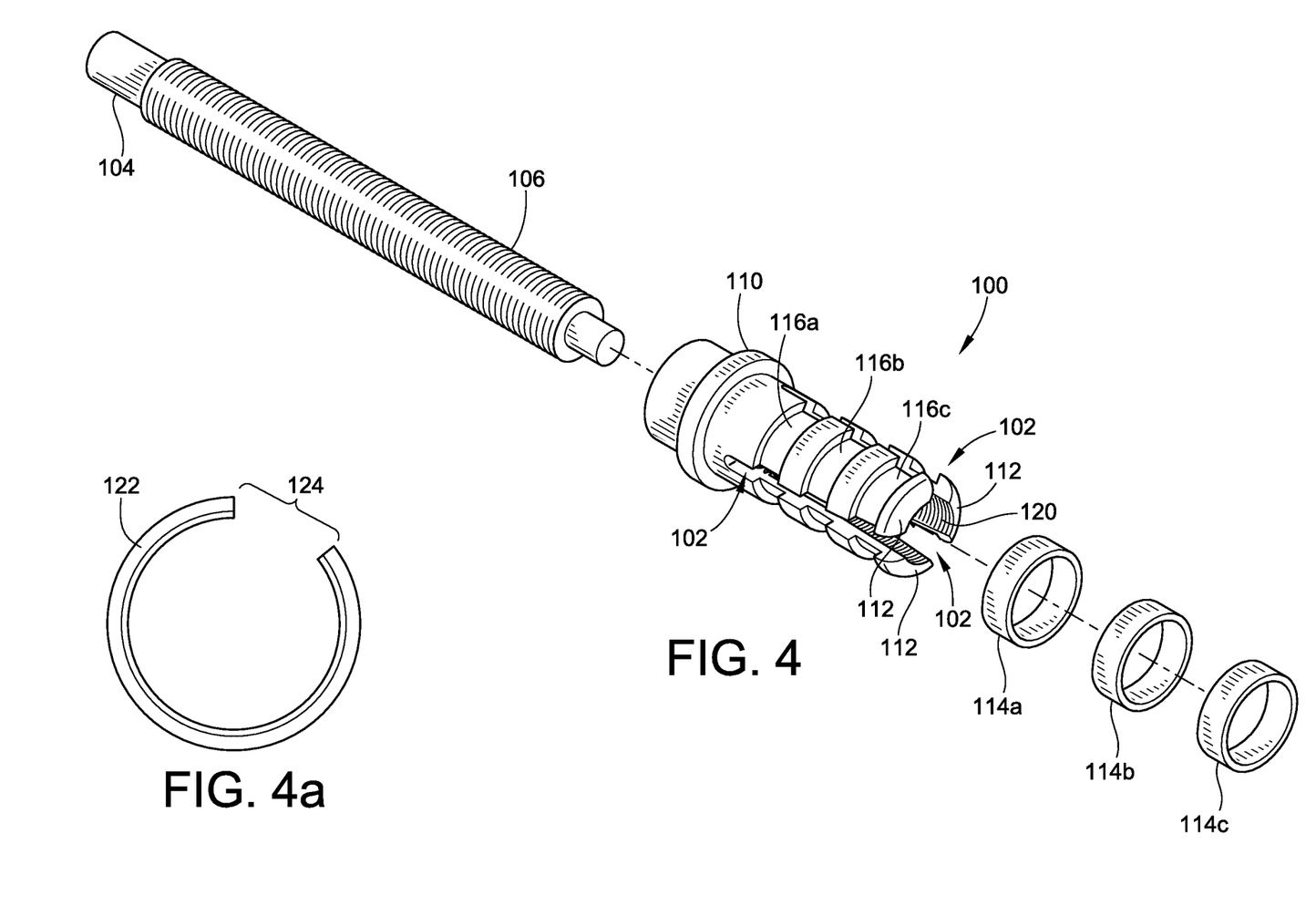
FIG. 4 is an exploded view of the lead screw and nut assembly in accordance with a particular embodiment of the present invention.
FIG. 4a is a snap ring in accordance with a particular embodiment of the present invention.

FIG. 4 is an exploded view of the nut 100 including the lead screw 104. The compression rings 114a, 114b, and 114c are illustrated in an unmounted state prior to being installed in their respective groove 116a, 116b, and 116c. In the unmounted state an outer diameter of the bottom surface of the grooves 116a, 116b, and 116c is larger than an inner diameter of the compression rings 114a, 114b, and 114c. When the compression rings 114a, 114b, and 114c are mounted in grooves 116a, 116b, and 116c, the outer diameter of the bottom surface of grooves 116a, 116b, and 116c is pressed against and bounded to be no larger than the inner diameter of the compression rings 114a, 114b, and 114c. This forces the flexible fingers 112 radially inward due to the internal tensile stress this presents within the compression rings 114.

In embodiments using rigid compression rings 114, the process of installing the compression rings 114 entails compressing the flexible fingers 112 radially inward such that the outer diameter of the outer periphery defined by the flexible fingers 112 between grooves 116a, 116b, and 116c is reduced. Typically, this reduction must be enough that each of the compression rings 114a, 114b, and 114c may be installed in the respective grooves 116a, 116b, and 116c without interference with the walls of the grooves 116a, 116b, and 116c.

Due to this, the diameter formed by the flexible fingers will typically be reduced to a smaller dimension than the outer diameter of the lead screw 104. Therefore, when the compression rings 114 are rigid this process will take place prior to installation of the nut on the lead screw 104.

Subsequently, the nut 100, including the compression rings 114a, 114b, and 114c, is installed onto the lead screw 104. With the compression rings 114a, 114b, and 114c installed, the nut 100 will maintain a stable axial position along the lead screw 104. As the nut 100 is used over time, the internal threads 120 may become worn and a certain amount of axial slop may result. To overcome this issue without having to install a new nut 100, new compression rings 114a, 114b, and 114c with a higher compressive force (e.g. having a smaller inner diameter) may be installed onto the nut 100. To install a new set of compression rings, the nut 100 will typically be removed from the lead screw 104. Once the nut 100 is removed from the lead screw 104, the flexible fingers 112 can be flexed radially toward one another in a fashion that decreases the outer and inner diameters of the flexible fingers 112 to a value less than the inner diameter of the compression rings 114a, 114b, and 114c. At this point, the compression rings 114a, 114b, and 114c can be removed. A new set of compression rings 114a, 114b, and 114c can then be installed onto the nut 100 in a similar manner to the one described earlier.

In another embodiment, the compression forces may vary between each groove 116 by having the outer diameter of the bottom surface of the grooves 116 being different. In this embodiment, the compression rings 114 may all have the same inner diameter. Because the compression rings 114 have the same inner diameter, a different force will be applied for each of the grooves with a different diameter of the bottom surface of the groove.

In another embodiment of the present invention, the compression rings 114 take the form of a "c" shaped snap ring 122, as illustrated in FIG. 4a. In this case, the snap ring 122 can be installed in the grooves 116 of the nut 100 while the nut 100 is on the lead screw 100. The snap ring 122 is formed from a single piece of material that is bent or molded in the shape of a "c." The snap ring 122 includes a mouth in the form of an opening 124. To install the snap ring 122, the opening 124 is placed against the groove 116 and pressed over the nut 100 until the snap ring 122 is seated in the groove 116. The snap ring 122 can be removed by pulling the snap ring 122 off in the opposite way as the snap ring 122 was put onto the nut 100.

Additionally, the snap ring 122 may be installed into grooves 116 while the nut 100 is on the lead screw 104. The snap ring 122 may be expanded such that the arcuate length of the opening 124 is made larger. While in the expanded state, the snap ring 122 may slide over the outer periphery of the flexible fingers 112 until it is over top of a groove 114. At this point the snap ring 122 can be returned to its nonexpanded state to seat into the groove 114. In some embodiments, the mouth 124 need not flex to the outer diameter of the bottom of the grooves. Instead, the mouth 124 need only expand large enough such that the inner diameter of the snap ring 122 is greater than an outer diameter of the structures defining the grooves 116, i.e. the lands formed between adjacent grooves 116.

Typically, a snap ring 122 providing a larger compressive force can be formed with equal thickness, width, and an equal amount of material by making the opening 124 smaller, such that the inner diameter of the snap ring 122 in a retracted state removed from the nut 100, is smaller. Because the opening 124 is small, the inner diameter of the snap ring 122 is decreased thereby increasing the compression force the snap ring 122 will exert, due to increased expansion/bending, when installed in the groove 116.

In yet another embodiment, the radial compression members 114 (from FIG. 1) are made of elastic material. In this particular embodiment, the radial compression members 114 can be installed after the nut 100 has been installed onto the drive screw 104 because the radial compression members 114 are made from an elastic material that can stretch over the flexible fingers 112 without having to collapse the flexible fingers 112 toward one another to reduce the circumference of the area formed by the flexible fingers 112. One such example of a compression member 114 made from an elastic material is an o-ring.

In yet another embodiment, the radial compression members 114 (from FIG. 1) are in the form of a coil spring. The coil spring may be a constant force spring, which is a spring or coil that as it changes in diameter it maintains a constant force.

Figure 5:
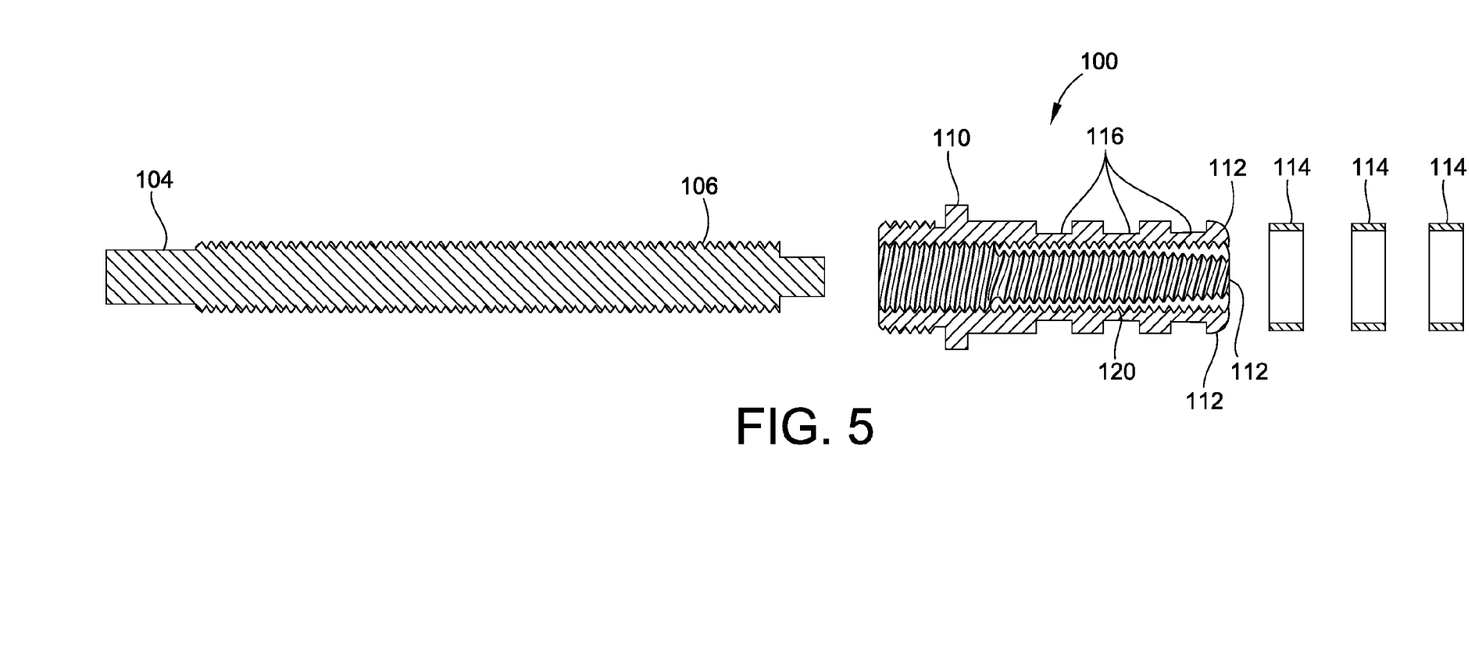
FIG. 5 is an exploded view of a cross section of the nut and lead screw assembly in accordance with a particular embodiment of the invention.

FIG. 5 illustrates an exploded cross-section view of the nut 100 including the lead screw 104. When the compression rings 114 are installed onto the nut 100, the compression rings 114 pull the flexible fingers 112 radially inward and consequently angularly closer. As the lead screw 104 is inserted into the nut 100, the inner threads of the flexible fingers 112 will mate with the external threads of the lead screw such that a maximum surface area is shared between the nut 100 and the lead screw 104. The compressive force exerted by the compression rings 114 causes the flexible fingers to engage the lead screw 104 such that unwanted axial slop between the lead screw 104 and the nut 100 is limited by radially clamping the fingers 112 between lead screw 104 and compression rings 114.

Figure 6:
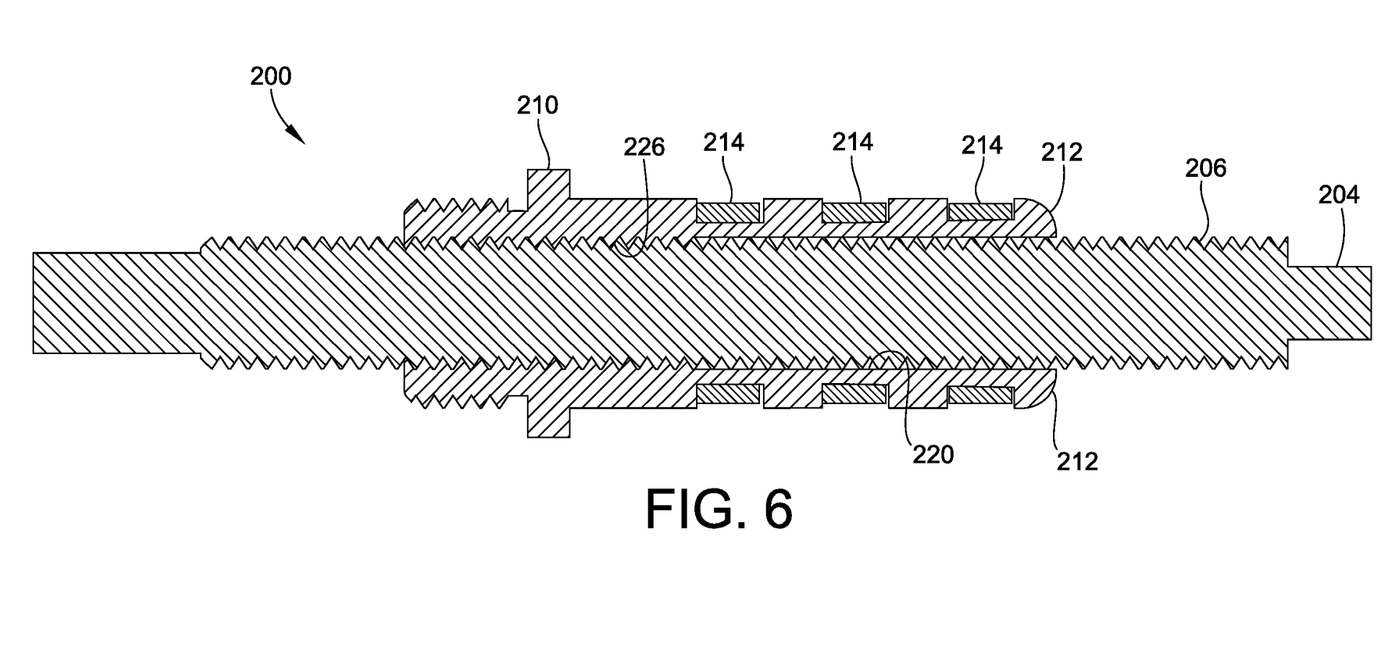
FIG. 6 is a cross section view of the nut and lead screw assembly in accordance with a particular embodiment of the present invention.
Figure 7:
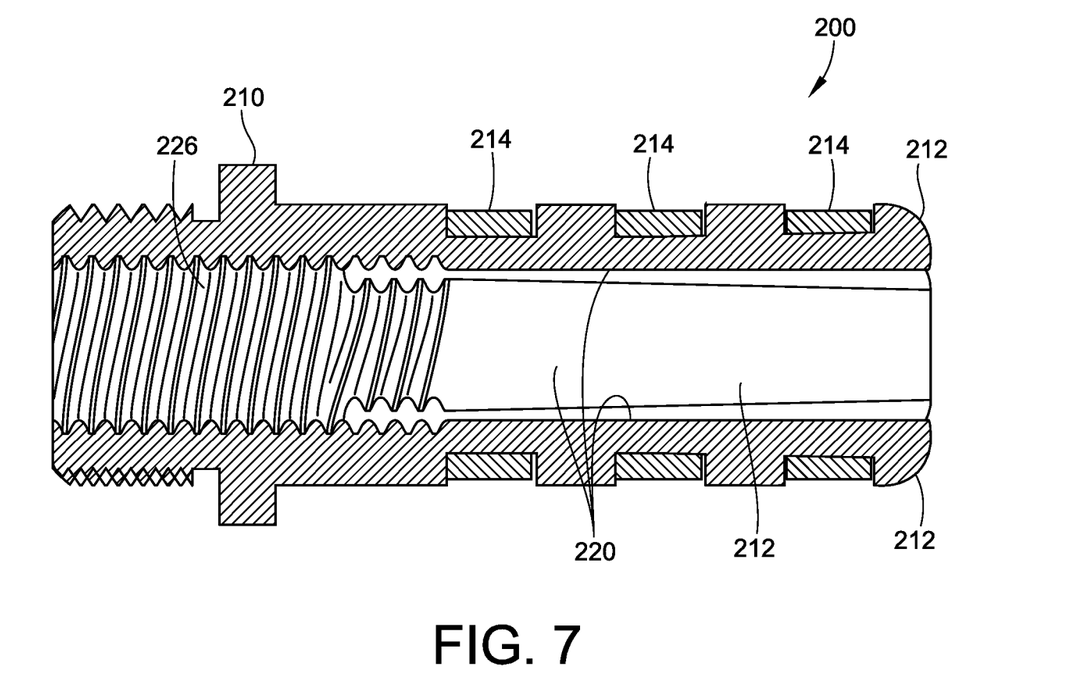
FIG. 7 is a close up view of a cross section of the nut in accordance with a particular embodiment of the present invention.
Figure 8:
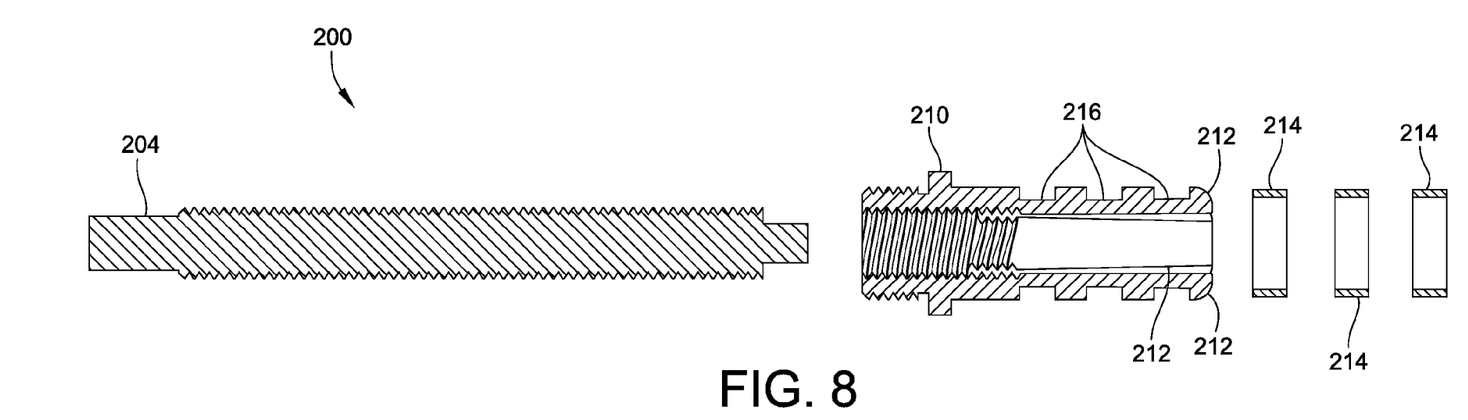
FIG. 8 is an exploded view of a cross section of the nut and lead screw assembly in accordance with a particular embodiment of the invention.

In another embodiment of the present invention, as illustrated in FIGS. 6-8, the flexible fingers 212 do not include the internal threads but rather have a smooth interior surface 220 over at least a portion of the interior surface of the flexible fingers 212. In certain embodiments, the smooth surface will extend less than 50% of the axial length of the flexible fingers 212. In even further embodiments, the smooth surface will extend less than 25% of the axial length of the flexible fingers 212. Typically, the portion of the inner surface of the flexible fingers 212 that is smooth will be from the edge of the first groove 214 closest to the base 210 extending over the entire surface up to a distal end of the flexible finger 212, as illustrated in FIG. 7. However, other embodiments are contemplated as well, such as a smooth surface over the entire inner surface of the flexible fingers 212 where only the base 210 includes threads 226, or where only the flexible fingers 212 include threads (not shown), and the base 210 is smooth.

Additionally, FIGS. 6-8 illustrate a nut 200 with flexible fingers 212 that have a smooth interior surface 220 over the majority of the length of the fingers 212. Nut 200 is installed onto the lead screw 204. The external threads 206 of lead screw 204 engage internal threads 226 of a base 210 of the nut 200. Further, compression rings 214 are installed in grooves 216 such that a compressive force exerted on the flexible fingers 212 causes the interior surface 220 of the flexible fingers 212 to radially engage the external threads 206 of the lead screw 204. Thus, the surface contact between the interior surface 220 and the exterior threads 206 under a force applied by the compression rings 214 limits unwanted slop in the position of the nut 200 along the lead screw 204.

FIGS. 9-12 illustrate various alternative embodiments of a nut with flexible fingers and compression members. Note that while the various embodiments illustrated in FIGS. 9-12 show three flexible fingers and a varying number of circumferential grooves and compression members, more or less of each of these that are illustrated are contemplated.

Figure 9:
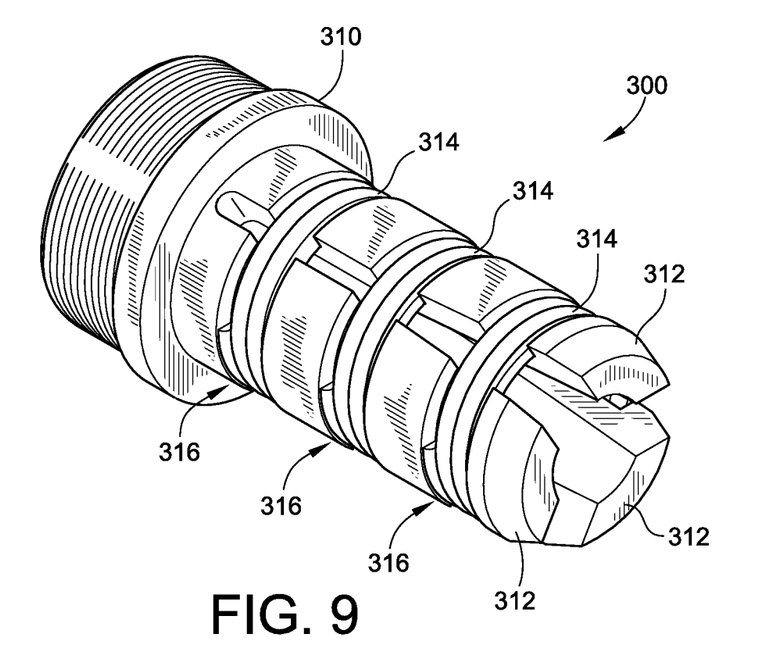
FIG. 9 is an isometric view of a nut that includes coil springs as the compression members in accordance with a particular embodiment of the present invention.

FIG. 9 illustrates another embodiment of a compression member 314 installed on a nut 300. Nut 300 includes three flexible fingers 312 that extend axially from a base 310. Nut 300 further includes three circumferential grooves 316 with compression members 314 in the form of coil springs 314 wrapping around the grooves 316. When initially installed, the coil springs 316 will be in an unwound state causing the internal forces in the coil springs 316 to try and wind the coil spring 316 back-up. This will generate the radial forces against the fingers 312. As the nut 300 wears, the coil spring 316 will press the fingers 312 radially inward. In doing so, the inner diameter of the coil spring 312 will reduce, and the coil spring 314 will windup. The coil spring 314 is not used to convert axial forces into radial forces, such as in prior art embodiments using the inclined ramp arrangements.

Figure 10:
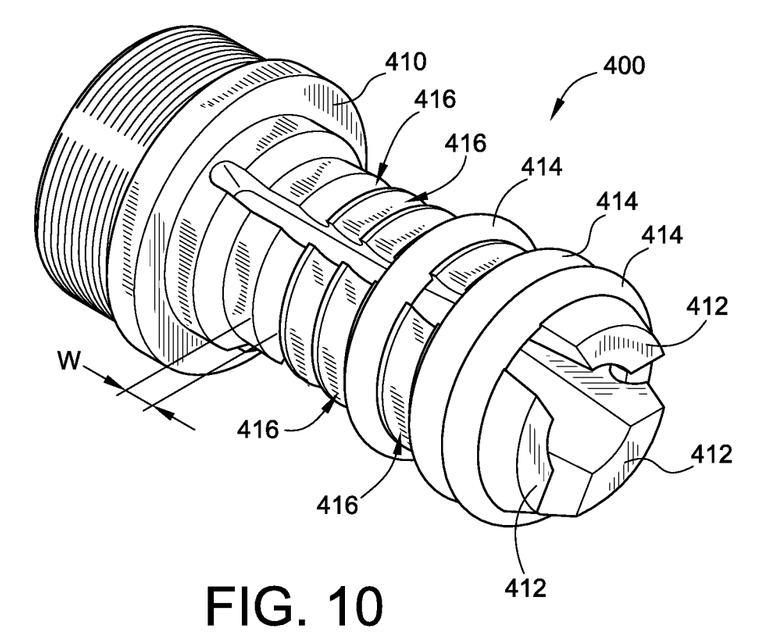
FIG. 10 is an isometric view of a nut with a plurality of circumferential grooves that includes o-rings as compression members in accordance with a particular embodiment of the present invention.

FIG. 10 illustrates another embodiment of the present invention in nut 400. Nut 400 includes three flexible fingers 412 that extend axially from a base 410. The nut 400 also includes a plurality of circumferential grooves 416. Each groove 416 has a width W. While the particular embodiment of the nut 400 illustrated in FIG. 10 shows each groove 416 with the same width W, it is contemplated that each groove 416 may have the same or a different width W. This ability to have different width grooves applies for all embodiments.

Additionally, the grooves 416 include a curved bottom surface. Compression members 414 are rounded such that they mate with the curved bottom surface of the groove 416. Further, each compression member 414 may be formed from a rigid or elastic material as previously described, or, as specifically illustrated in FIG. 10, the compression members 414 are o-rings. The outer diameter of the bottom of the grooves may vary from one groove to the next. For instance, the diameters may increase when moving away from the base such that the fingers 412 provide a generally tapered profile when moving away from the base towards distal free ends of the fingers 412. Alternatively, the outer diameter of the bottom of the grooves could decrease when moving away from the base toward the distal free ends.

Figure 11:
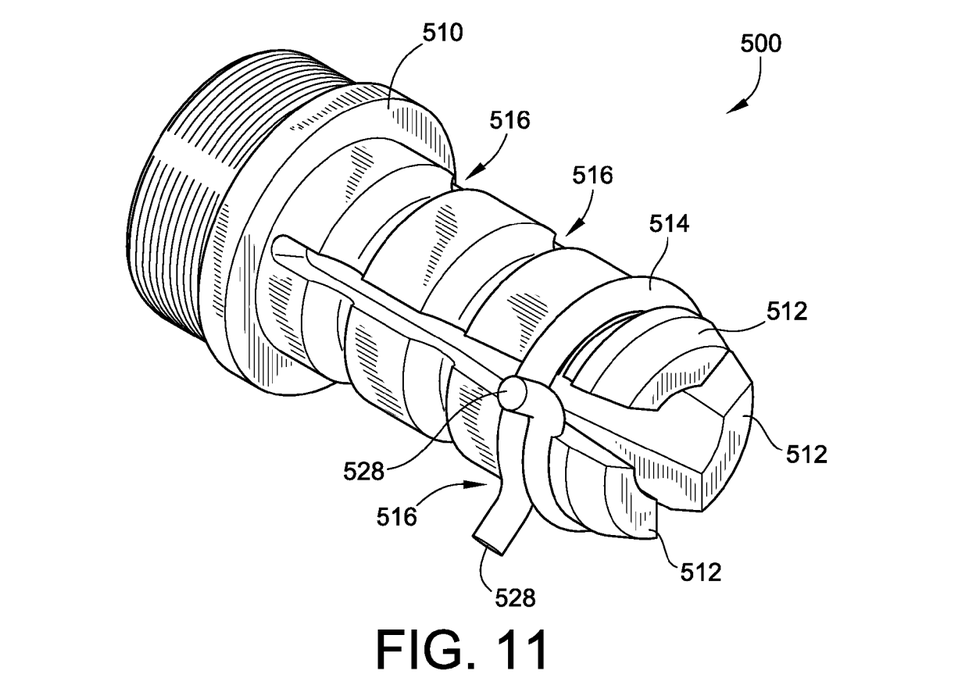
FIG. 11 is an isometric view of a nut with circumferential grooves with rounded bottoms that includes a hose-clamp spring as a compression member in accordance with a particular embodiment of the present invention.

FIG. 11 illustrates another embodiment of the present invention in nut 500. Nut 500 includes three flexible fingers 512 that extend axially from a base 510. Nut 500 further includes three circumferential grooves 516. Each groove 516 includes a rounded bottom that may receive a compression member 514. The single compression member 514 illustrated in FIG. 11 is in the form of a hose-clamp spring 514.

The hose-clamp spring 514 includes two ears 528. The ears 528 act as grips such that a user can grasp the hose-clamp spring 514 by the two ears 528 and compress the spring, which will expand an inner diameter of the hose-clamp spring 514 formed by a rounded body of the hose-clamp spring 514. By expanding the diameter of the rounded body of the hose-clamp spring 514 it can be placed over the flexible fingers 512 and installed in groove 516. Once the user releases the ears 528 the diameter of the rounded body of the hose-clamp spring 514 attempts to return to its former size while in an uncompressed state to assert a radially inward directed compressive force on the flexible fingers 512.

Figure 12:
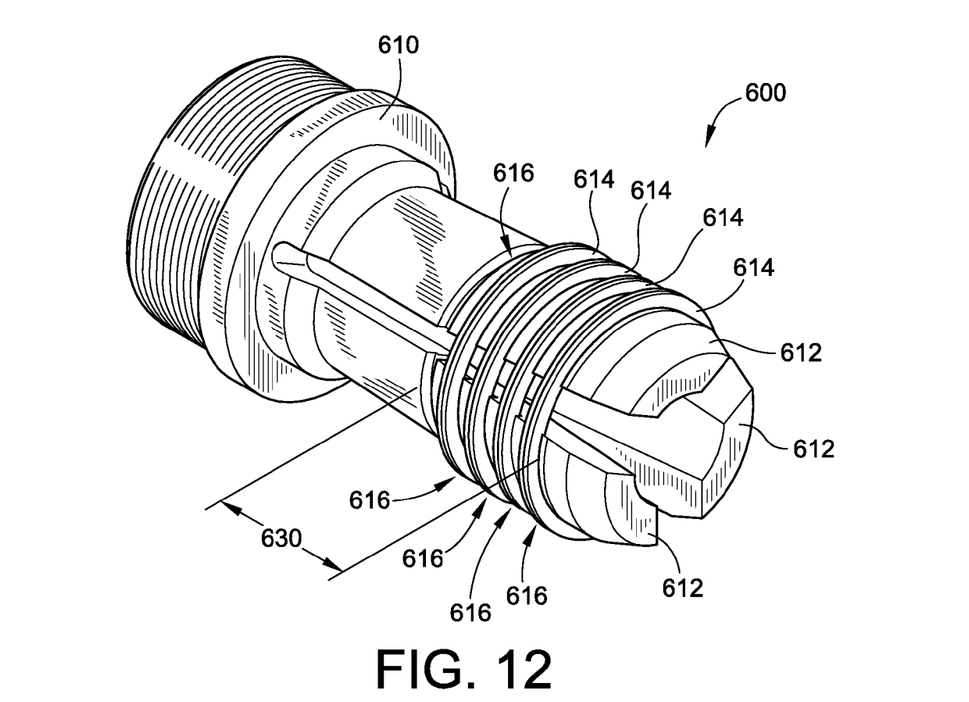
FIG. 12 is an isometric view of a nut with narrow circumferential grooves that includes narrow snap rings as compression members in accordance with a particular embodiment of the present invention.

FIG. 12 illustrates another embodiment of the present invention in nut 600. Nut 600 includes three flexible fingers 612 that extend axially from a base 610. The nut 600 also includes a plurality of grooves 616. Each groove 616 is located at an end portion 630 of the flexible fingers 612. Further, each groove is narrower than in previously illustrated embodiments such that narrow snap rings 614 will engage each groove 616 without axial motion along groove 616.

Figure 13:
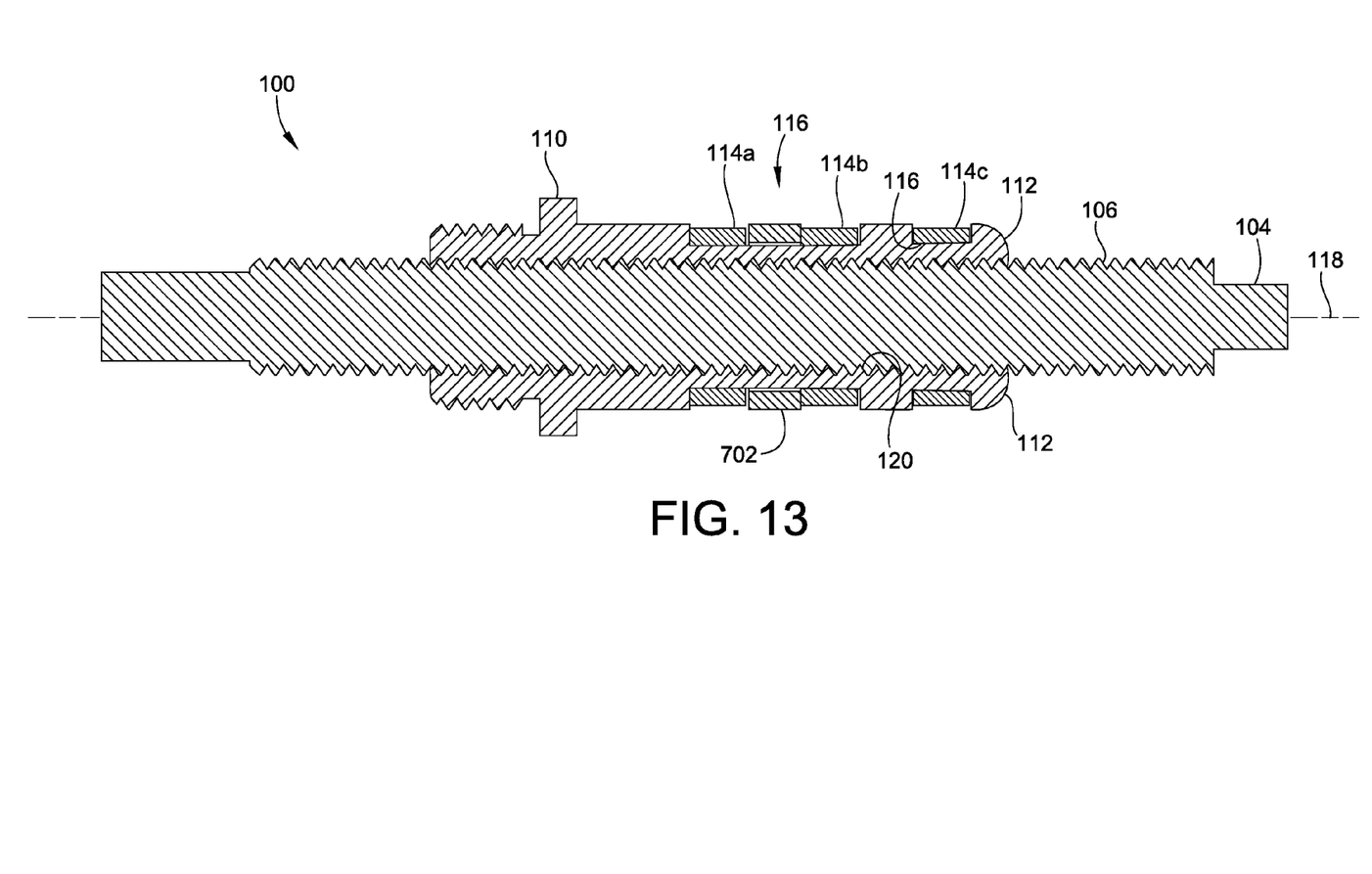
FIG. 13 is a cross section view of the nut and lead screw assembly that includes a spacer in accordance with a particular embodiment of the present invention.

FIG. 13 illustrates another embodiment of the present invention, where the axial locator structure or circumferential groove 116 includes a spacer 702. The spacer 702 is placed proximate the compression members 114a and 114b such that the spacer 702 axially positions the compression members 114a and 114b along the flexible fingers 112. Further, the spacer 702 could be provided in a kit that includes multiple spacers of varying length such that compression members 114 could be located at different axial positions along the flexible fingers 112. In a preferred embodiment, the flexible fingers define a single groove between base 110 and the distal end of the flexible fingers. The use of the spacers 702 allows for fully customizing the radial force profile that can be used as the compression members 114 can be positioned anywhere along the length of the flexible fingers 112 and maintained in those desired locations using the axial spacers. Typically, the spaces 702 will be designed to have a larger inner diameter than the bottom surface of the groove between the base and the distal end of the fingers such that they do not provide any radial force. However, other embodiments may use other compression members as spacers.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A nut for linear movement along a lead screw, the nut comprising:
   a base;
   a plurality of flexible fingers joined to the base and extending axially from the base between a fixed end joined to the base and a free end;
   at least one radial compression member defining an opening and having the plurality of flexible fingers extending through the opening; and
   an axial locator structure formed by at least a portion of an outer surface of the flexible fingers, the at least one radial compression member being installed proximate the axial locator structure to apply a radially inward directed compressive force to the plurality of flexible fingers; and
   wherein the plurality of flexible fingers and the at least one radial compression member are configured such that the radially inward directed compressive force is constant and remains the same as a first inner diameter of the opening of the at least one radial compression member changes.

2. The nut of claim 1, wherein the axial locator structure is at least one circumferential groove and the at least one radial compression member is located within the groove, each flexible finger defining a portion of the circumferential groove.

3. The nut of claim 2, wherein a second diameter of an outer surface of the circumferential groove is larger than the first diameter of an inner surface defining the opening of the radial compression member when the radial compression member is in an unmounted state.

4. The nut of claim 3, wherein the second diameter of the outer surface of the circumferential groove is the same size as the first diameter of the inner surface defining the opening of the radial compression member when the radial compression member is in a mounted state.

5. The nut of claim 2, wherein the at least one radial compression member is in the form of a continuous rigid ring.

6. The nut of claim 1, wherein the base and the plurality of flexible fingers are composed of a plastic material.

7. The nut of claim 1, wherein an axially extending gap angularly separates adjacent flexible fingers.

8. The nut of claim 1, wherein the radial compression member is in the form of a circular elastic band.

9. The nut of claim 1, wherein the radial compression member is in the form of a snap ring being a discontinuous ring.

10. The nut of claim 1, wherein the radial compression member is in the form of a spring.

11. The nut of claim 1, wherein the axial locator structure includes a spacer.

12. The nut of claim 1, wherein the base is internally threaded and configured to engage an external thread of the lead screw and at least a portion of an interior surface of the plurality of flexible fingers is smooth and not threaded.

13. The nut of claim 12, wherein at least 25% of the interior surface of the plurality of the flexible fingers is smooth and not threaded.

14. The nut of claim 12, wherein the interior surface of the plurality of the flexible fingers is smooth from the axial locator structure to a distal end of the plurality of flexible fingers.

15. The nut of claim 12, wherein the smooth surface on the interior of the plurality of flexible fingers engages the external threads of the lead screw.

16. The nut of claim 1, wherein only the base is internally threaded and an entire surface area of an interior surface of the plurality of flexible fingers is smooth.

17. A method of installing the nut of claim 1 onto a lead screw comprising:
compressing the plurality of flexible fingers radially inward;
mounting the least one radial compression member proximate the axial locator structure; and
inserting the lead screw into a channel formed by inner surfaces of the base and the plurality of flexible fingers and engaging threads provided by at least a portion of the surfaces defining the channel with the lead screw.

18. The method of claim 17, wherein the at least a portion of the surfaces defining the channel providing the threads is only provided by the inner surface of the base.

19. The method of claim 17, wherein the at least one radial compression member is in the form of a rigid ring.

20. The method of claim 19, wherein the step of mounting further comprises axially sliding the rigid ring over the plurality of flexible fingers toward the base of the nut prior to the step of inserting the lead screw.

21. The method of claim 17, wherein the radial compression member is in the form of a circular elastic band.

22. The method of claim 21, wherein the step of mounting further comprises expanding an inner circumference of the circular elastic band such that the circumference of the circular elastic band is larger than an outer circumference of the plurality of flexible fingers; and
sliding the elastic band over the plurality of flexible fingers toward the base of the nut prior to the step of inserting the lead screw.

23. The method of claim 17, wherein the radial compression member is in the form of a snap ring comprising a mouth.

24. The method of claim 23, wherein the axial locator structure is in the form of a groove and the step of mounting further comprises:
aligning the mouth of the snap ring with the groove;
pressing the snap ring against the groove until the snap ring slides into position around the groove.

25. The method of claim 23, wherein the step of mounting further comprises:
expanding a circumference of the snap ring such that the mouth of the snap ring is larger than a diameter of the lead screw;
sliding, radially, the lead screw through the mouth; and
sliding axially the snap ring over the plurality of flexible fingers toward the base of the nut.

26. The nut of claim 1, wherein the at least one radial compression member is a constant force compression ring providing a same radially inward directed force to the plurality of flexible fingers as the first inner diameter of the opening changes so that the plurality of flexible fingers and the at least one radial compression member provide the same radially inward directed compression force to the lead screw when mounted thereto.

27. A nut for linear movement along a lead screw, the nut comprising:
a base;
a plurality of flexible fingers joined to the base and extending axially from the base between a fixed end joined to the base and a free end;
at least one radial compression member defining an opening and having the plurality of flexible fingers extending through the opening; and
an axial locator structure formed by at least a portion of an outer surface of the flexible fingers, the at least one radial compression member being installed proximate the axial locator structure to apply a radially inward directed compressive force to the plurality of flexible fingers;
wherein the axial locator structure is at least one circumferential groove and the at least one radial compression member is located within the groove, each flexible finger defining a portion of the circumferential groove; and
wherein the at least one circumferential groove includes a first circumferential groove and a second circumferential groove where the first circumferential groove has a first bottom surface having a first diameter and the second circumferential groove has a second bottom surface having a second diameter, the second diameter being different than the first diameter.

* * * * *